G. ROHR.
Grain Drill.
No 9,803.
Patented June 21, 1853.
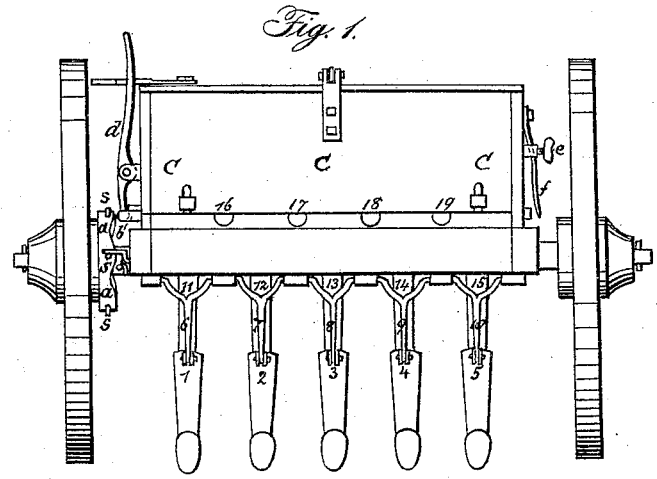
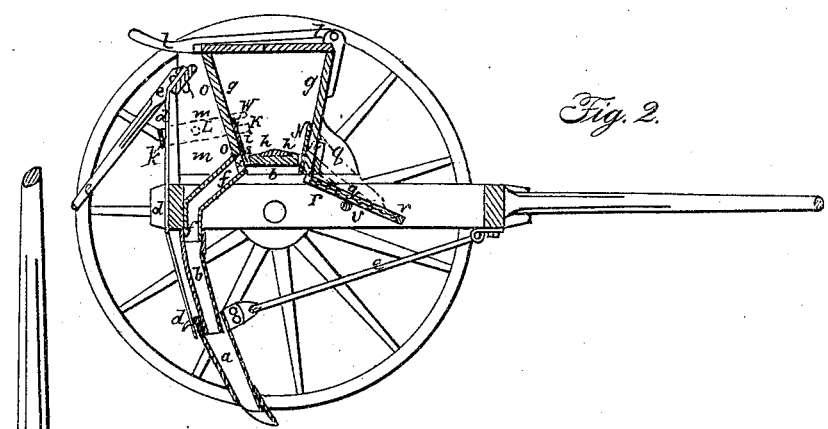
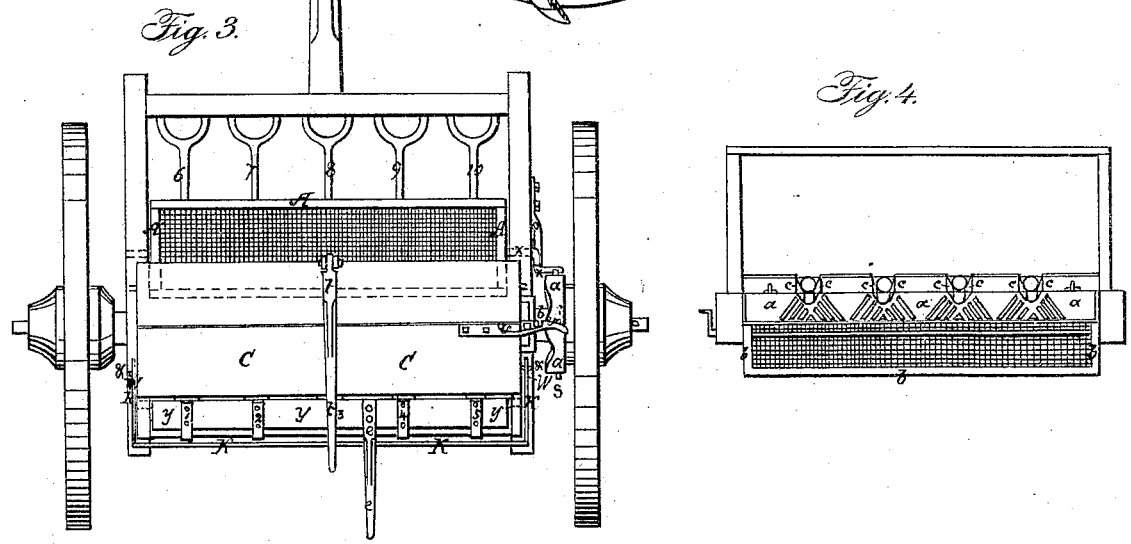
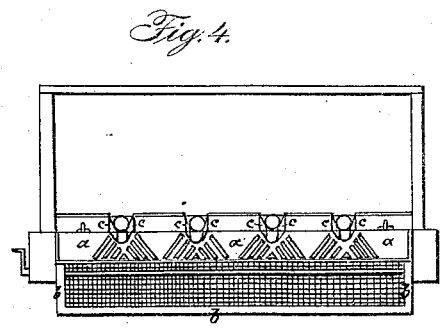

UNITED STATES PATENT OFFICE.

GEO. ROHR, OF CHARLESTOWN, VIRGINIA.

IMPROVEMENT IN SEED-PLANTERS.

Specification forming part of Letters Patent No. 9,803, dated June 21, 1853.

*To all whom it may concern:*

Be it known that I, GEORGE ROHR, of Charlestown, in the county of Jefferson and State of Virginia, have invented and made certain new and useful improvements on the agricultural implement or machine called the "Wheat-Drill or Grain-Planter;" and to enable others to be skilled in the making, use, and application of my improvements I will herewith proceed to describe the construction and operation thereof, the nature and principles of said improvements consisting in constructing a frame-work somewhat similar to the ordinary method of construction of planters, supporting said frame-work on two or more wheels, and attaching to said frame-work a hopper or seeding-chamber for holding the grain, and connecting thereto seeding-spouts and drill or furrow spouts for delivering and depositing the grain; but all of which construction and application is more fully shown and set forth by drawings and references to the parts thereof by letters and figures of indication, which I do hereby declare give an exact representation of the construction of the apparatus, and which drawings make a part of this specification.

Figure 1 is a front elevation, showing the seeding-spouts 1 2 3 4 5 with their lifting-lever connection 6 7 8 9 10. *a a* is the flanged hub-piece that gives the reciprocating motion to the seeding-bar *b*, which bar works longitudinally through the hopper of seed-box C C C. *d* is the lever used for shifting the bar *b* for the purpose of stopping off the seed. *e f* is the thumb-screw and spring to regulate the distance or shifting of the seeding-bar, and to cause its reaction. *s s s* are pins inserted into the hub-flange for the purpose of shaking the oscillating sieve or grain-scatterer, the crank or rod *x* thereof only being shown resting on the reacting spring *o*.

Fig. 2 is a transverse sectional view, showing the seeding-spouts *a* and conducting-pipe *b* with the lifting-lever connection and the lifting-strap *d d d* with the lever-lifting handle *e e*. *f f* is the feeding-spout connected with the seeding-chamber or hopper *g g*. *h h* is the double beveled sliding seeding-bar. *i* is the regulating-valve plate or seeding-graduator, running longitudinally through the feeding-hopper or seed-chamber, and resting on the back lateral, *o o*, and having slots *s* opposite to the vents *x*, and which plate is elevated or depressed by the regulating-lever rod K K, which rod is attached on the outside of hopper and works on an axis, L, in the end board, *m m*, of hopper *g g*. N is another longitudinal graduating-plate arranged similar to the first one, but regulated by screws instead of by a lever-rod. *p* shows the other side vents, to which may be attached a second set or series of spouts or seeders, (indicated by the red lines *q q*,) so that, if necessary, the rows or drills may be closer together. *r r* show section of the grain-scatterer or oscillating screen which works on an axis V. *t t* is a catch-handle to hold up the lifting-handle *e e*, to which is attached the lifting-straps *d d d*. *y* is the bar to which the straps are attached, all of which are used to lift the spouts up, if coming in contact with an obstruction, and also when the seeding is done or the machine is not depositing.

Fig. 3 is a top view of the machine, showing the seeding-chamber or feeding-hopper *c c*, the hub-flange *a a; d,* shifting-lever; *s s s*, the shaking-pins to hub-flange for the oscillating of the crank-rod *x*. *o* is the reacting spring or support for the crank-rod of the oscillating sieve or grain-scatterer A A A. *v v* is a catch to hold the lever *d* in stopping off the feeding of the grain. *b* is the sliding or reciprocating seeding-bar. *e e* is the lever or spout-lifting handle. *t t* is the catch or hold-up handle. 6 7 8 9 10 are connecting-spout rods. *y y y* is the strap-lifting bar, with the straps 1 2 3 4 5. K K K K is the lever-rod connected to the graduating feed-plate, the ends *f f* of which protrude from the ends of the hopper or seeding-chamber C C, and which ends rest in the forks *w w* of the lever-rod K K, as shown in sectional view, Fig. 2. A A A is the oscillating sieve or grain-scatterer working in front of the seeding-chamber or hopper C C.

Fig. 4 is a longitudinal front view of the hopper or seed-chamber, showing the oscillating grain-scatterer or shaking-sieve *b b b*, together with the ridged vibrating scatterer or hopper-apron *a a a* and the short detachable spouts *c c c c c c c*.

The operation of my improved drill or seeding apparatus is as follows: The hopper is filled with the seed or grain, and the machine being set in motion, by horse-power or otherwise, causes the carriage-wheels to revolve, to one of which wheels is attached or affixed a circular or scalloped hub-flange, *a a*, Fig. 1. This scalloped hub-flange is used for the purpose of reciprocating longitudinally the seeding-bar *b* throughout the seeding-chamber or hopper C, Fig. 1. This bar *b* has notches or niches cut in it at proper intervals on each longitudinal edge of the upward side, so that in the reciprocating or sliding of the bar the grain can escape out through apertures corresponding thereto in the side of the seeding-chamber or hopper, as shown at 16 17 18 19, Fig. 1; but by the reciprocating of the seeding-bar the grain does not flow continuously out, thus preventing an undue deposit or amount of seeding. Immediately in front of these apertures, and attached to the front and back parts of the seeding-chamber C C, are attached conducting-spouts, with which are combined the furrow-spouts 1 2 3 4 5, Fig. 1, through which the grain passes, and by which it is deposited into the furrow, the form of the depositing spouts being such that the earth falls after the movement of the spout and covers the deposited grain effectually.

The two sets of spouts are only used when required to plant or deposit the grain in close drills or furrows; or the front series of detachable spouts only are used in distributing or sowing grain in fields or on land where corn may have been cut off, in which case, generally, portions of the stalks are left standing on the ground, but which do not prevent the depositing or sowing of grain between said rows of stalks. Again, if the agriculturist desires to sow or plant the grain broadcast, he can do so by attaching the ridged vibrating hopper-apron or scatterer *a a a*, together with the oscillating sieve or sower *b b b*, Fig. 4, in which case the short spouts *c c c c c c c*, Fig. 4, are easily attached, and the grain, readily falling out of the seeding-chamber or grain-fountain onto the rigid vibrating scatterer or hopper-apron *a a a a*, Fig. 4, is scattered by coming in contact with the oblique ridges or inequalities of the apron, and, thence falling into the oscillating sieve, is more readily scattered or disseminated over the surface of the soil in passing through the meshes or interstices of the sieve *b b b*, Fig. 4. It must, however, be observed that the graduating-plate or sliding valve *i*, Fig. 2, is to be shut down to cut off the passage of the grain from the outlet *s* in sectional view, Fig. 2, and thus, if desired, the spouts 1 2 3 4 5, being no longer used as depositors, may instead be used for the purpose of a harrow by arranging them with the lifting-straps 1 2 3 4 5, Fig. 3, so as not to enter the soil too deep, but merely drag it, after the manner of a harrow. By attaching in front of the machine one or more horses the whole is moved along readily on the wheels and managed and conducted by the driver, who may walk behind or may sit on the frame work of the machine.

Thus having fully described the construction, operation, and principles of my improved seeding apparatus, and desiring to secure the same by Letters Patent of the United States, what I claim as new and original with myself is as follows, viz:

The invention, use, and application of a ridged or fluted or corrugated vibrating apron device, *a a a a*, combined with the oscillating screen or grain-scatterer *b b b*, arranged with a crank-handle axis, *x*, Fig. 4, actuated by the pins or cogs *s s s* on the scallop-like hub-flange of the propelling-wheel, together with the reacting spring-rest *o*, as shown in Fig. 3, the whole arranged and used together with a seed-fountain, C C, with apertures so constructed as to admit of connecting thereto short detachable or movable mouth-pieces or outlet-spouts *c c c c c c c* for the more perfect and free escape of the seed from the grain chamber or fountain onto the apron and scatterer *a a a b b b*, Fig. 4, specifically as set forth.

GEORGE ROHR.

Witnesses:
SAML. CAMERON,
J. W. GALLAHER.